Figure 1:
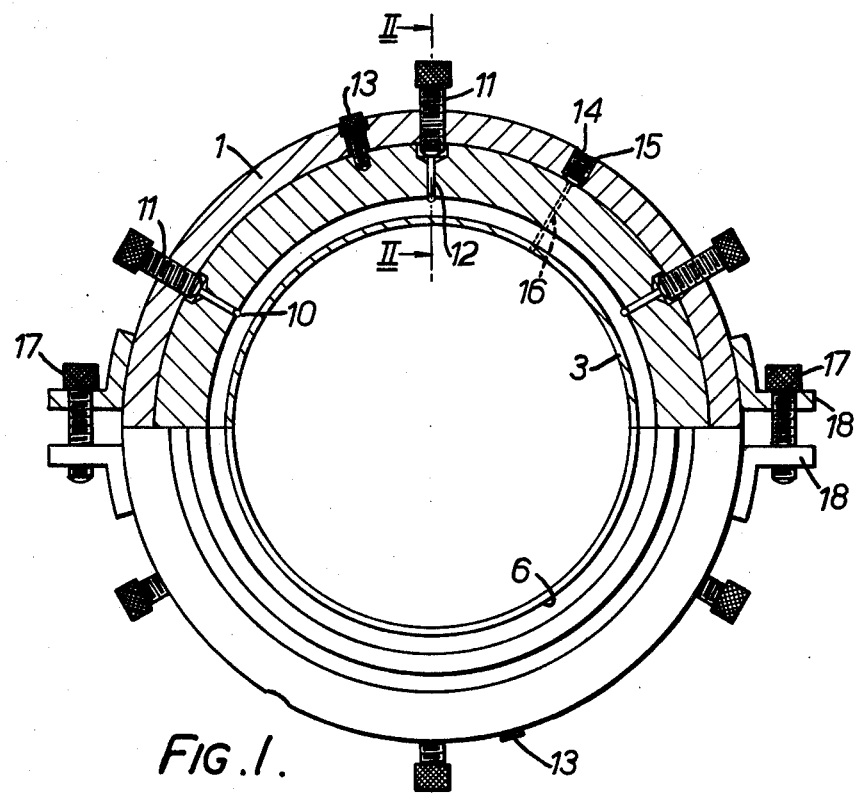

United States Patent [19]

Cook

[11] 4,274,640

[45] Jun. 23, 1981

[54] SEALING DEVICES

[75] Inventor: Barrie J. A. Cook, Penarth, Wales

[73] Assignee: Sibex (Constructions) Limited, Glamorganshire, England

[21] Appl. No.: 62,614

[22] Filed: Aug. 1, 1979

[51] Int. Cl.³ .................... F16J 15/06; F16L 55/18
[52] U.S. Cl. ............................................ 277/9; 277/1;
  277/72 FM; 277/129; 285/15; 285/18; 285/295
[58] Field of Search ................... 285/15, 18, 96, 294,
  285/295, 297, 381; 277/1, 9, 9.5, 72 FM, 126,
  128, 129, 226

[56] References Cited

U.S. PATENT DOCUMENTS

| | | | |
|---|---|---|---|
| 1,989,644 | 1/1935 | McKee | 277/126 X |
| 2,283,974 | 5/1942 | Dillon | 285/18 |
| 2,340,016 | 1/1944 | Pruiett | 277/9 |
| 3,620,554 | 11/1971 | Ward et al. | 285/18 |
| 3,770,301 | 11/1973 | Adams | 285/15 |

FOREIGN PATENT DOCUMENTS 858314  1/1961  United Kingdom ................... 285/18

OTHER PUBLICATIONS

*Machine Design*, periodical, issue of Jun. 21, 1962, p. 180, "Joints For Cylindrical Sections."

*Primary Examiner*—Robert S. Ward, Jr.
*Attorney, Agent, or Firm*—Andrus, Sceales, Starke & Sawall

[57] ABSTRACT

A sealing device for insertion in a flanged pipe coupling comprises a split ring with an annular sealing member seated in a groove in one axially facing side of the ring. At intervals around the ring there are screws which project radially inwardly into the base of the groove to co-operate with the concealed face of the sealing member. This face and the adjacent screw ends combine in a wedging or camming action as the screws are turned to urge the sealing member out from the groove. When placed between the flanges of a pipe coupling this action forms an effective seal which can be completed by injecting sealing compound through the ring. The ring, if not the sealing member, is re-usable if the seal has to be broken.

8 Claims, 4 Drawing Figures

U.S. Patent

Jun. 23, 1981

4,274,640

SEALING DEVICES

This invention relates to joint sealing devices for insertion between opposed flanges at the ends of pipeline sections. It is primarily concerned with those devices which have a sealing compound injected through the joint to complete the seal.

Such sealing devices are known, but the problem with many of them is removal for re-use. If alterations are made requiring the seal to be broken, the whole device generally has to be scrapped. They are very expensive items when used in large pipelines, and this scrapping is wasteful. It is an object of this invention to provide a sealing device of which at least the major part is re-usable.

According to the present invention there is provided a sealing device for insertion between opposed end flanges of adjacent pipeline sections, comprising a split ring with an annular sealing member seated therein to be exposed at one axially facing side, and cam means operable from the radially outward side for urging said sealing member outwardly, in the axial direction, from said ring.

In a preferred embodiment the cam means includes screw means entered generally radially through the ring to engage the reverse, unexposed side of the sealing member, which provides a cam surface. Conveniently each screw means includes a screw and a balled, domed or coned element co-operating with said reverse side of the sealing member. Each ring section may be an integral member or the ring may be formed from inner and outer ring members, the inner one carrying the sealing member and the outer having the screws enaged therein.

Provision will generally be made for injecting sealing compound radially inwardly through the ring.

Figures 2, 3, 4:
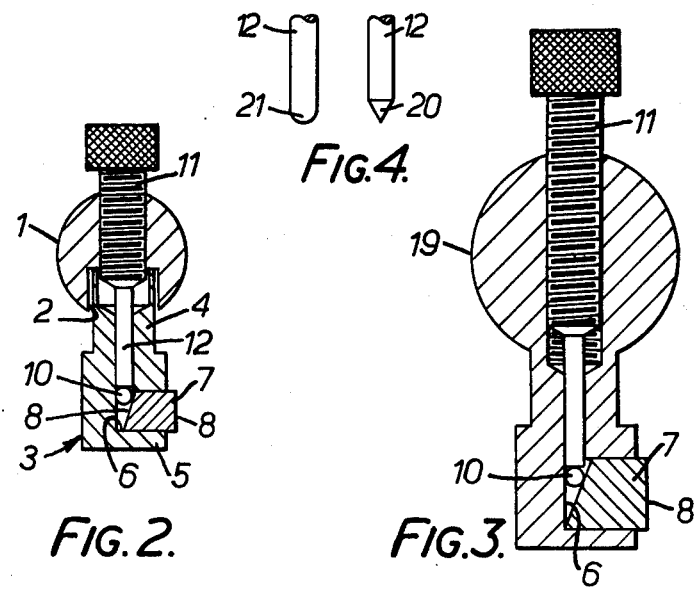

For a better understanding of the invention some embodiments will now be described, by way of example, with reference to the accompanying drawing, in which:

FIG. 1 is an end view, half in cross-section, of a sealing device for insertion between opposed flanges in a pipeline, FIG. 2 is a section on the line II—II of FIG. 1, FIG. 3 is a section, similar to FIG. 2, but of an alternative sealing device, and FIG. 4 shows details of screw devices with alternative working ends.

The device of FIGS. 1 and 2 includes a split outer ring 1 of circular cross-section with an internally facing groove 2. A split inner ring 3 seats in the groove 2 by means of a narrow outer portion 4, and it has a wider inner portion 5 with opposed faces in radial planes and an annular groove 6 in one of those faces. A sealing ring 7 is housed in this groove 6, its exposed face 8 being in a radial plane while its opposite face 9 is shallow frusto-conical and engaged at intervals around the ring by spherical ends 10 of adjusting screws 11. These screw-threadedly engage in radial bores in the outer ring 1, and have extensions 12 terminating in the spherical ends 10, projecting through narrower bores in the inner ring 3. The correct registry of these bores is obtained by means of two diametrically opposed locating screws 13, also engaged in the outer ring 1 and projecting into depressions in the inner ring 3. Injection holes 14 for sealing compound are also provided at diametrically opposed points, these consisting of a wide screw-threaded portion 15 in the outer ring 1, to receive the nozzle of an injection gun, and a narrow passage 16 through the inner ring 3.

The two parts of the split outer ring 1 can be clamped together by means of screws or bolts 17 engaged in and through lugs 18, and the inner ring 3 and sealing ring 7 are also halved so that they can be fitted around an existing joint.

In use, the inner ring 3 is placed between opposed flanges at the adjacent ends of two pipeline sections, with the sealing ring 7 retracted so that its face 8 is almost flush with the adjacent radial face of the wide portion 5 of the ring 3. The outer ring 1 is placed around the inner ring and located by means of screws 13, and the whole assembly is then clamped in place. Each screw 11 is hardened down so that the spherical ends 10 are urged radially inwards over the inclined face 9. The resulting cam action forces the sealing ring 7 partially out from the ring 3 in the axial direction so that its face 8 is pressed tightly against one of the pipe flanges, while the opposed face of the ring portion 5 is urged by reaction in the opposite direction tightly against the end flange of the other pipe section. It will be appreciated that slight misalignment of pipe sections can be tolerated, for the sealing ring can be made to project varying amounts around the inner ring 3. When the screws 11 are fully hardened down, sealing compound is injected through the holes 14, and internal pressure in the pipe will ensure that the sealing compound spreads out and permeates into any interstices that remain, including the part of the groove 6 not occupied by the sealing ring.

The device shown in section in FIG. 3 is identical in operation. It differs in construction in that the inner and outer ring sections are made integral so that there is a single split ring 19. The adjusting screw, spherical end, groove and sealing ring are referenced similarly to FIG. 2.

The screws 11 need not be integral. For example, the spherical ends may be separate ball bearings, and the extensions 12 could be separate pins. Also, instead of spherical ends, the extensions 12 might terminate with a coned or domed configuration, as shown at 20 and 21 in FIG. 4.

These devices are largely re-usable, although the sealing rings themselves may need replacement. However, they are only a relatively small part to replace.

We claim:

1. A sealing device for insertion between opposed end flanges of adjacent pipeline sections, comprising a split ring with an annular sealing member seated therein to be exposed at one axially facing side, and cam means operable from the radially outward side for urging said sealig member outwardly, in the axial direction, from said ring.

2. A sealing device as claimed in claim 1, wherein the cam means includes screw means entered generally radially through the ring to engage the reverse, unexposed side of the sealing member, which provides a cam surface.

3. A sealing device as claimed in claim 2, wherein each screw means includes a screw and a balled, domed or coned element co-operating with said reverse side of the sealing member.

4. A sealing device as claimed in claim 1, 2 or 3, wherein each ring section is integral.

5. A sealing device as claimed in claim 3, wherein in additiom to being split, the ring is formed from inner and outer ring members, the inner one carrying the sealing member and the outer having the screws engaged therein.

6. A sealing device as claimed in claim 1, wherein provision is made for injecting sealing compound radially inwardly through the ring.

7. A method of sealing a pipeline comprising sections with end flanges, wherein a device as claimed in claim 6 is fitted between an opposed pair of flanges and a sealing compound is subsequently injected.

8. A pipeline comprising sections with end flanges, between at least one opposed pair of which is fitted a sealing device as claimed in claim 1.

* * * * *